United States Patent
Makita et al.

(10) Patent No.: US 6,919,820 B2
(45) Date of Patent: Jul. 19, 2005

(54) VEHICLE HEADLAMP SYSTEM

(75) Inventors: Hiroyuki Makita, Shizuoka (JP); Takeshi Kimura, Shizuoka (JP); Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 391 days.

(21) Appl. No.: 09/897,324

(22) Filed: Jul. 2, 2001

(65) Prior Publication Data

US 2002/0003473 A1 Jan. 10, 2002

(51) Int. Cl.$^7$ ................................................. G08G 1/16
(52) U.S. Cl. ...................... 340/903; 340/436; 340/469; 340/457.2; 362/460; 362/464; 362/465; 362/573; 250/214 D
(58) Field of Search ................................ 340/903, 436, 340/469, 457.2; 362/459, 460, 464, 465, 467, 573; 315/52; 307/10.8; 250/214 D

(56) References Cited

U.S. PATENT DOCUMENTS

| | | | |
|---|---|---|---|
| 3,683,379 A | | 8/1972 | Saddler et al. |
| 5,349,430 A | | 9/1994 | Yamamoto et al. |
| 5,430,450 A | | 7/1995 | Holmes |
| 5,645,338 A | | 7/1997 | Kobayashi |
| 5,796,094 A | * | 8/1998 | Schofield et al. ......... 250/208.1 |
| 5,914,651 A | * | 6/1999 | Smalls ........................ 340/436 |
| 6,550,944 B2 | * | 4/2003 | Kusagaya .................... 362/466 |

FOREIGN PATENT DOCUMENTS

| | | |
|---|---|---|
| DE | 196 32 252 A1 | 1/1998 |
| DE | 196 34 754 A1 | 3/1998 |
| DE | 197 56 574 A1 | 10/1998 |
| DE | 298 24 081 U1 | 7/2000 |
| DE | 19953447 * | 5/2001 |
| EP | 0 340 735 | 11/1989 |
| FR | 2 762 268 | 10/1998 |
| WO | WO 99/28151 | 6/1999 |

* cited by examiner

Primary Examiner—Julie Bichngoc Lieu
(74) Attorney, Agent, or Firm—Fish & Richardson P.C.

(57) ABSTRACT

A vehicle headlamp system with headlamps, each of which contains a lamp unit for emitting beams forward with a predetermined luminous intensity distribution. The system carries out beam emission with a luminous intensity distribution corresponding to the travel conditions of a vehicle. In an implementation, when the speed of one's own vehicle exceeds 25 km/h, a low-beam luminous intensity distribution P(L) is varied according to a vehicle-to-vehicle distance in relation to a preceding vehicle. Remote visibility is increased by positioning a cut-off line slightly upward when the vehicle-to-vehicle distance L is long, whereas when the vehicle-to-vehicle distance L is short the cut-off line is lowered slightly in order not to give a glare to the driver of the preceding vehicle. But when the vehicle speed V is 25 km/h or lower, the low-beam luminous intensity distribution P(L) is fixed at a downward position which prevents glare and prevents an unpleasant feeling that something is wrong from being given to the driver of the preceding vehicle resulting from the change of the low-beam luminous intensity distribution P(L).

9 Claims, 6 Drawing Sheets

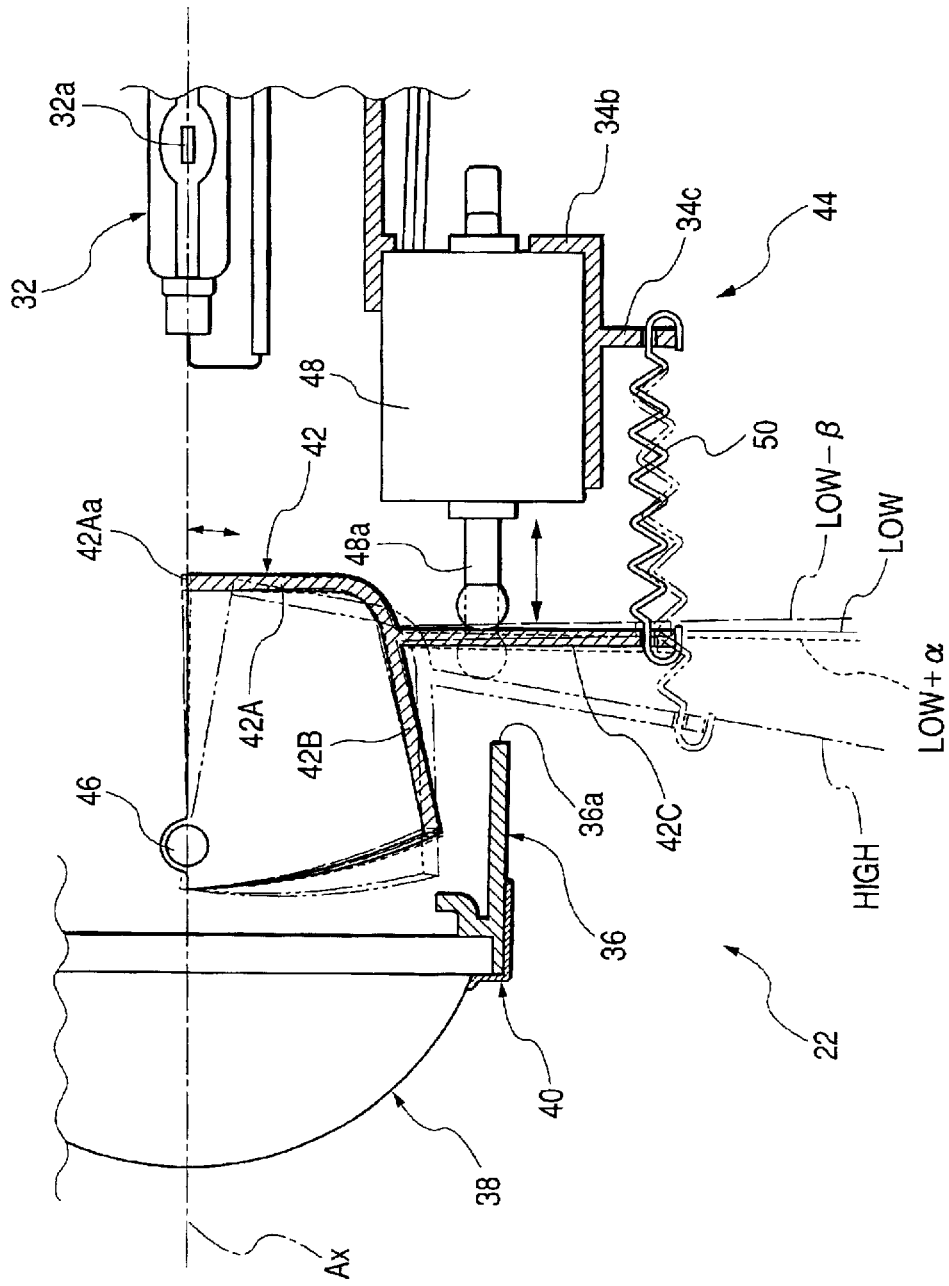

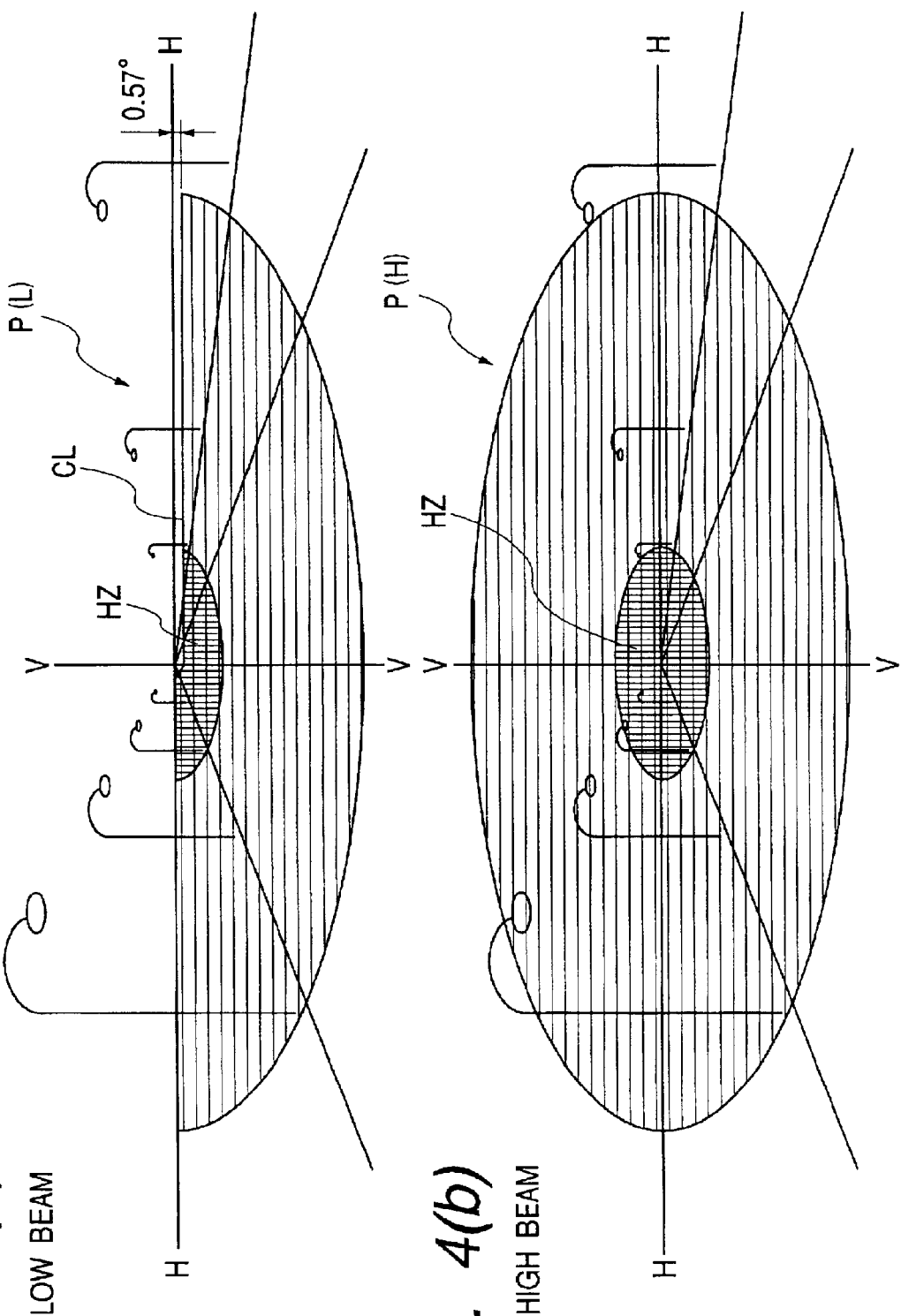

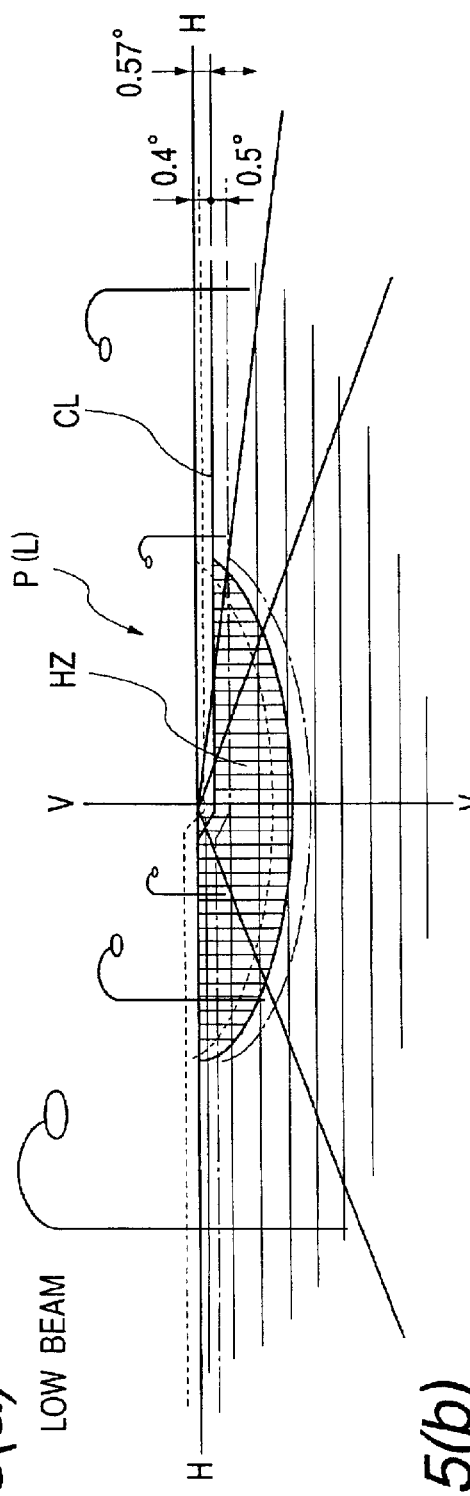
FIG. 5(a) LOW BEAM
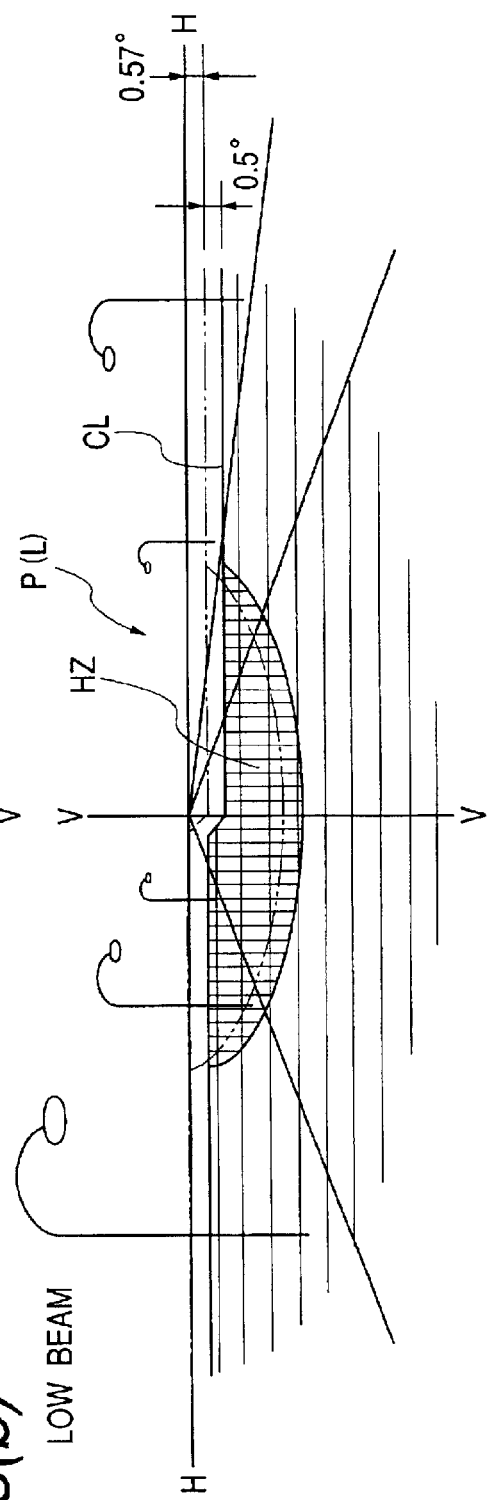
FIG. 5(b) LOW BEAM

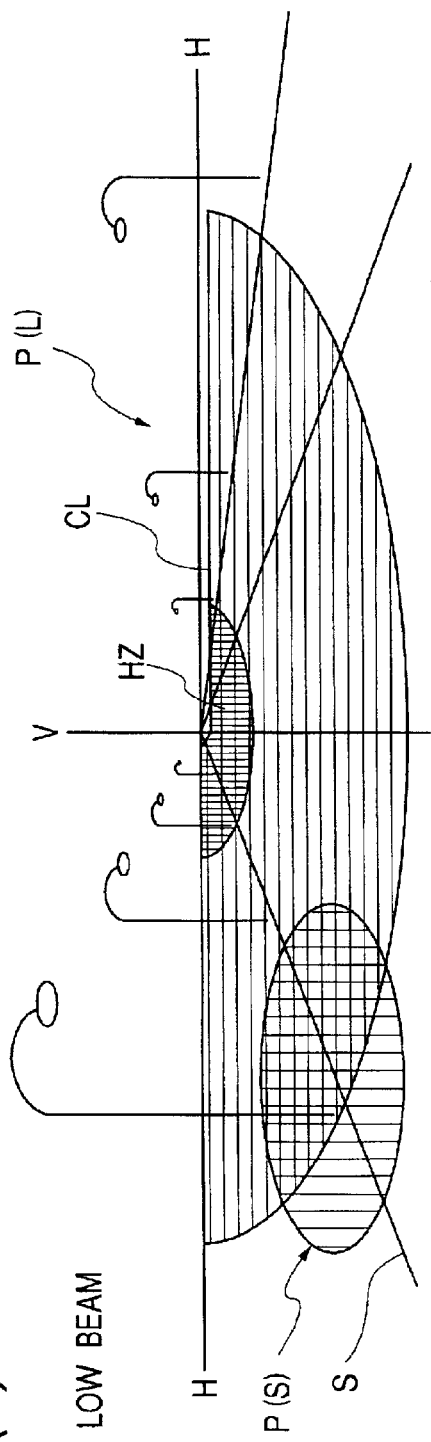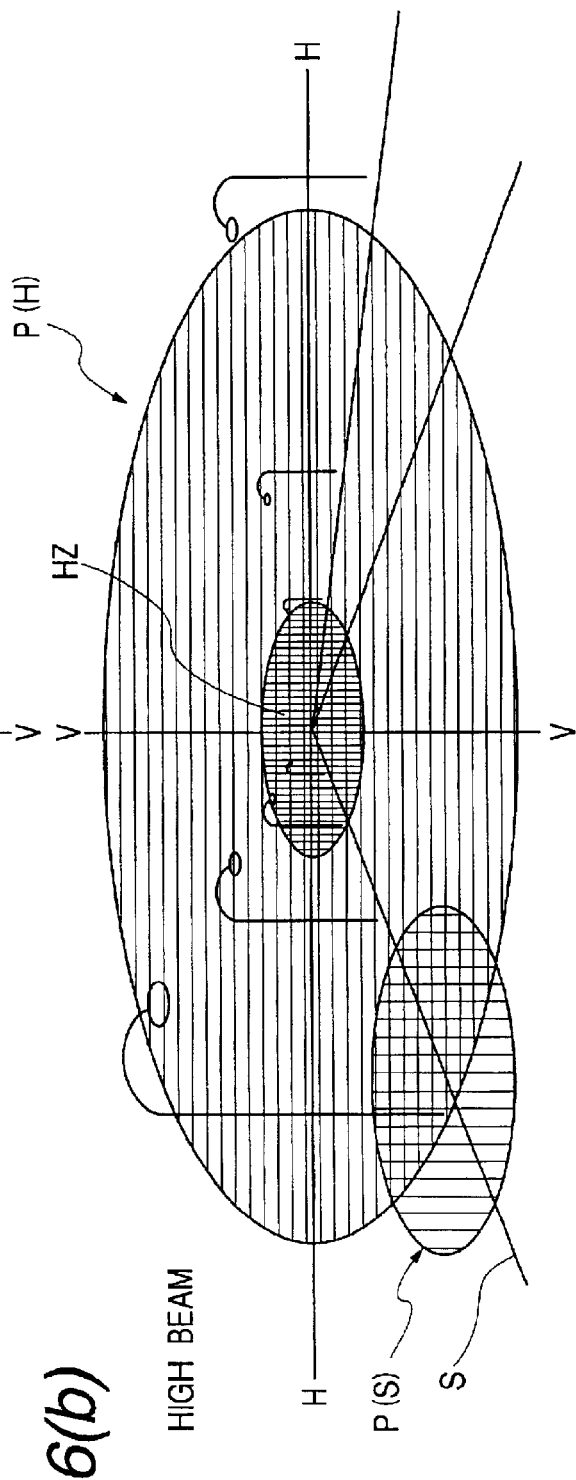
FIG. 6(a) LOW BEAM
FIG. 6(b) HIGH BEAM

VEHICLE HEADLAMP SYSTEM

BACKGROUND OF THE INVENTION

The present invention relates to a vehicle headlamp system with headlamps, each of which contains a lamp unit in a lamp body.

There are conventionally known vehicle headlamps containing a lamp unit in a lamp body, and also those which are designed to vary the luminous intensity distribution formed by such a lamp unit in response to vehicle speed However, an arrangement for varying a luminous intensity distribution only in response to the vehicle speed is not capable of beam emission with a luminous intensity distribution corresponding to the travel conditions of a vehicle.

SUMMARY OF THE INVENTION

The present invention, in view of the foregoing problem, provides a vehicle headlamp system with headlamps, each of which contains a lamp unit within a lamp body for emitting beams forward with a predetermined luminous intensity distribution in such a manner as to carry out beam emission with a luminous intensity distribution corresponding to the travel conditions of a vehicle.

In order to provide such operation, the invention is arranged so that a luminous intensity distribution may be varied in consideration of not only the speed of one's own vehicle, but also the vehicle-to-vehicle distance between one's own vehicle and a vehicle running ahead of one's own vehicle.

More specifically, a vehicle headlamp system with headlamps within a lamp body, each of which contains a lamp unit for emitting beams forward with a predetermined luminous intensity distribution includes a vehicle-to-vehicle distance measuring means for measuring the vehicle-to-vehicle distance between one's own vehicle and a preceding vehicle, and a variable luminous intensity control means for varying the luminous intensity distribution according to the vehicle-to-vehicle distance when the speed of one's own vehicle exceeds a predetermined value.

The 'lamp unit' is not limited to a specific construction, but may be a parabolic lamp unit having a reflector formed with, for example, a rotary parabolic surface or the like as a reference. Otherwise, a projector type lamp unit may be used. The projector lamp unit may have a light source disposed in a manner substantially coaxial with an optical axis extending in the longitudinal direction of the vehicle, a reflector for reflecting light from the light source forward closer to the optical axis, a condenser lens provided in front of the reflector, and a shade which is provided between the condenser lens and the reflector and used for shielding part of the light reflected from the reflector.

In connection with the light source of the 'lamp unit', it is not limited to a specific one in construction, but may be the discharge light-emitting portion of a discharge bulb, the filament of an incandescent bulb such as a halogen bulb, or the like.

The 'vehicle-to-vehicle' distance measuring means' is not limited to a specific means in construction but may be, for example, a laser radar or the like, as long as the means is capable of measuring the vehicle-to-vehicle distance between one's own vehicle and a preceding vehicle.

The method of 'varying the luminous intensity distribution' by the variable luminous intensity control means is not limited to a specific method, but may be a method of varying the configuration of the luminous intensity distribution by moving the component elements of the lamp unit such as a shade, a light source bulb, a reflector and the like, or varying the direction of the luminous intensity distribution by tilting the lamp unit itself.

As described above, the vehicle headlamp system according to the invention is such that the lamp unit is contained in the lamp body of each headlamp to carry out forward beam emission with the predetermined luminous intensity distribution by using the lamp unit. Further, the vehicle headlamp system is provided with the vehicle-to-vehicle distance measuring means for measuring the vehicle-to-vehicle distance between one's own vehicle and a preceding vehicle, and when the speed of one's own vehicle exceeds a predetermined value, the luminous intensity distribution of the lamp unit is varied by the variable luminous intensity control means according to the vehicle-to-vehicle distance therebetween. Therefore, the following operation and/or working effect is achievable.

With an increase in the vehicle speed to a certain degree, importance is attached to securing sufficient forward visibility of the road surface ahead of the vehicle in view of increasing the travel safety of the vehicle. As the luminous intensity distribution of the lamp unit is varied with the distance to a preceding vehicle according to the invention, remote visibility is increased by turning the luminous intensity distribution slightly upward when the vehicle-to-vehicle distance is long, whereas the luminous intensity distribution is turned slightly downward when the vehicle-to-vehicle distance is short in order to prevent giving the driver of a preceding vehicle a glare, whereby beam emission can be carried out with a luminous intensity distribution according to the travel conditions of the vehicle.

With the arrangement above, by adapting the variable luminous intensity control means to fix the luminous intensity distribution while the speed of one's own vehicle is kept at a predetermined value or lower, one can prevent an unpleasant feeling that something is wrong, resulting from the change of the low-beam luminous intensity distribution, from being given to the driver of a preceding vehicle in a low vehicle speed zone in which the remote visibility is not so important.

The variation modes of the luminous intensity distribution are not restricted as described above, and in case where the luminous intensity distribution has the cut-off line at its upper end, beam emission can be carried out with a luminous intensity distribution according to the travel conditions of the vehicle by vertically moving the position of the cut-off line so as to vary the luminous intensity distribution.

While the vehicle is running at a predetermined value or lower, the cut-off line may be fixed to the lowermost position to ensure that no glare is given to the driver of a preceding vehicle.

In four-wheel vehicles in general, since a headlamp is provided on both the left and right sides of the vehicle to form a pair of headlamps, symmetry in design of the headlamps may be achieved by containing the vehicle-to-vehicle distance measuring means in the lamp body of the headlamp on one side out of the pair of left- and right-side headlamps, and by containing an auxiliary in a position corresponding to the vehicle-to-vehicle distance measuring means in the lamp body of the headlamp on the other. Thus, the vehicle-to-vehicle distance measuring means can be incorporated in the headlamp pair without a feeling of wrongness about the design of both headlamps.

The auxiliary lamp may be provided in the headlamp positioned on the road shoulder side, and used for irradiating the road shoulder portion of the road surface ahead of the vehicle in order to irradiate the road shoulder portion with a reasonable lamp arrangement.

BRIEF DESCRIPTION OF THE DRAWINGS

FIG. 3 is a detailed side view of a portion of FIG. 2.

FIGS. 4a and 4b are diagrams illustrating a luminous intensity distribution of light emitted ahead of a vehicle from the lamp unit in a low beam and a high beam state, respectively.

FIGS. 5a and 5b are diagrams illustrating a luminous intensity distribution for explaining beam emission control in the vehicle headlamp system.

FIGS. 6a and 6b are luminous intensity distributions of light for irradiating a road shoulder, which light is emitted ahead of the vehicle from an adverse weather lamp of the vehicle headlamp system, in the low beam state and the high beam state, respectively.

DESCRIPTION OF THE PREFERRED EMBODIMENTS

An embodiment of the present invention will now be described with reference to the drawings.

Figure 1:
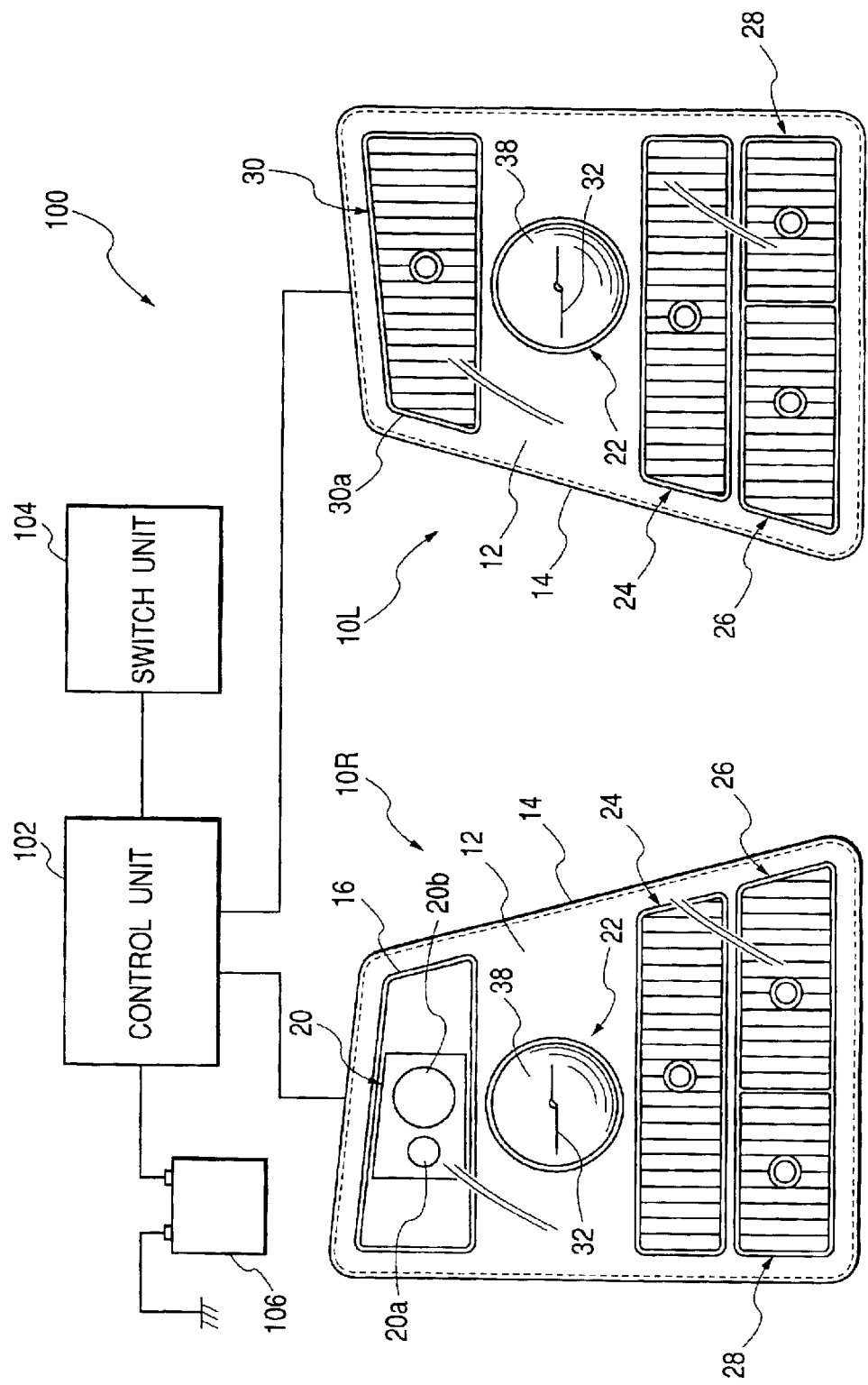
FIG. 1 is an overall block diagram illustrating a vehicle headlamp system embodying the invention.

FIG. 1 is an overall block diagram illustrating a vehicle headlamp system embodying the invention.

As shown in FIG. 1, a vehicle headlamp system 100 is provided to a large-sized vehicle such as a truck and comprises a pair of left- and right-side headlamps 10L and 10R disposed in the front end portion of a vehicle, a vehicle-to-vehicle distance sensor 20 (a vehicle-to-vehicle distance measuring means) incorporated in the right-side headlamp 10R, a control unit 102 (a variable luminous intensity control means) connected to the headlamps 10L and 10R, a switch unit 104 connected to the control unit 102, and a battery power supply 106 connected to the control unit 102.

In each of the headlamps 10L and 10R, a lamp unit 22 is formed of a headlamp body, various lamps and the like that are housed in a lamp chamber formed with a transparent cover 12 and a lamp body 14.

More specifically, the left-side headlamp 10L contains the lamp unit 22, a front turn-signal lamp 24, a cornering lamp 26, a driving lamp 28, and an adverse weather lamp (bad weather lamp) 30, whereas the right-side headlamp 10R contains the lamp unit 22, a front turn-signal lamp 24, a cornering lamp 26, a driving lamp 28, and the vehicle-to-vehicle distance sensor 20.

In any one of the headlamps 10L and 10R, the lamp unit 22 is positioned slightly upward in the center of the lamp chamber, and the front turn-signal lamp 24 is disposed below and near the lamp unit 22. The cornering lamp 26 and the driving lamp 28 are laterally and integrally formed in a manner adjacent to each other and also disposed below and near the front turn-signal lamp 24. Further, the adverse weather lamp 30 of the left-side headlamp 10L and the vehicle-to-vehicle distance sensor 20 of the right-side headlamp 10R are disposed above and near the respective lamp units 22. The vehicle-to-vehicle distance sensor 20 is incorporated in a housing 16 symmetrical in shape to the reflector 30a of the adverse weather lamp 30.

The lamp unit 22 carries out either high- or low-beam emission and in the low-beam emitting condition, a luminous intensity distribution may be varied according to the travel conditions as will be described later.

The front turn-signal lamp 24 is a lamp that operates together with a direction indicator to flash on and off The cornering lamp 26 is a lamp that emits light in the direction in which a vehicle is being driven around a curve. The intensity of the cornering lamp may be varied in a manner interlocked with the operation of the direction indicator or the rotation of a steering wheel, in order to irradiate a sideways area in a direction of 45 degrees with respect to the vehicle. The driving lamp 28 is an additionally turned-on lamp for increasing remote visibility in the high-beam emitting condition that is optionally and selectively turned on by a driver. The adverse weather lamp 30 is a lamp that increases visibility by irradiating a road shoulder portion when the road surface ahead of the vehicle is wet and it is difficult to see when the vehicle is traveling in rainy weather, and it is turned on when rain drops are detected.

The vehicle-to-vehicle distance sensor 20 may be an infrared laser radar. The distance sensor may cause the light emitting portion 20a to emit a pulse beam forward, and may receive the pulse beam reflected from a vehicle running ahead of one's own vehicle at the light receiving portion 20b, whereby to measure the distance between both vehicles. The distance may be calculated from the time difference between the beam emission and the beam reception.

The control unit 102 may receive the signals detected from the vehicle-to-vehicle distance sensor 20 and various sensors such as a vehicle speed sensor, a rain drop sensor and the like. Various operating signals may also be received from the switch unit 104 including a beam switching operation, a driving lamp turning on-off operation and the like. On the basis of these input signals, the control unit 102 may control the on-off state of the lamp units 22 of the respective headlamps 10L and 10R as well as control the lamps 24, 26, 28 and 30. Moreover, the control unit 102 may control the beam switching of the lamp units 22 of the headlamps 10L and 10R and may control variable luminous intensity distribution in the low-beam emitting condition.

Figure 2:
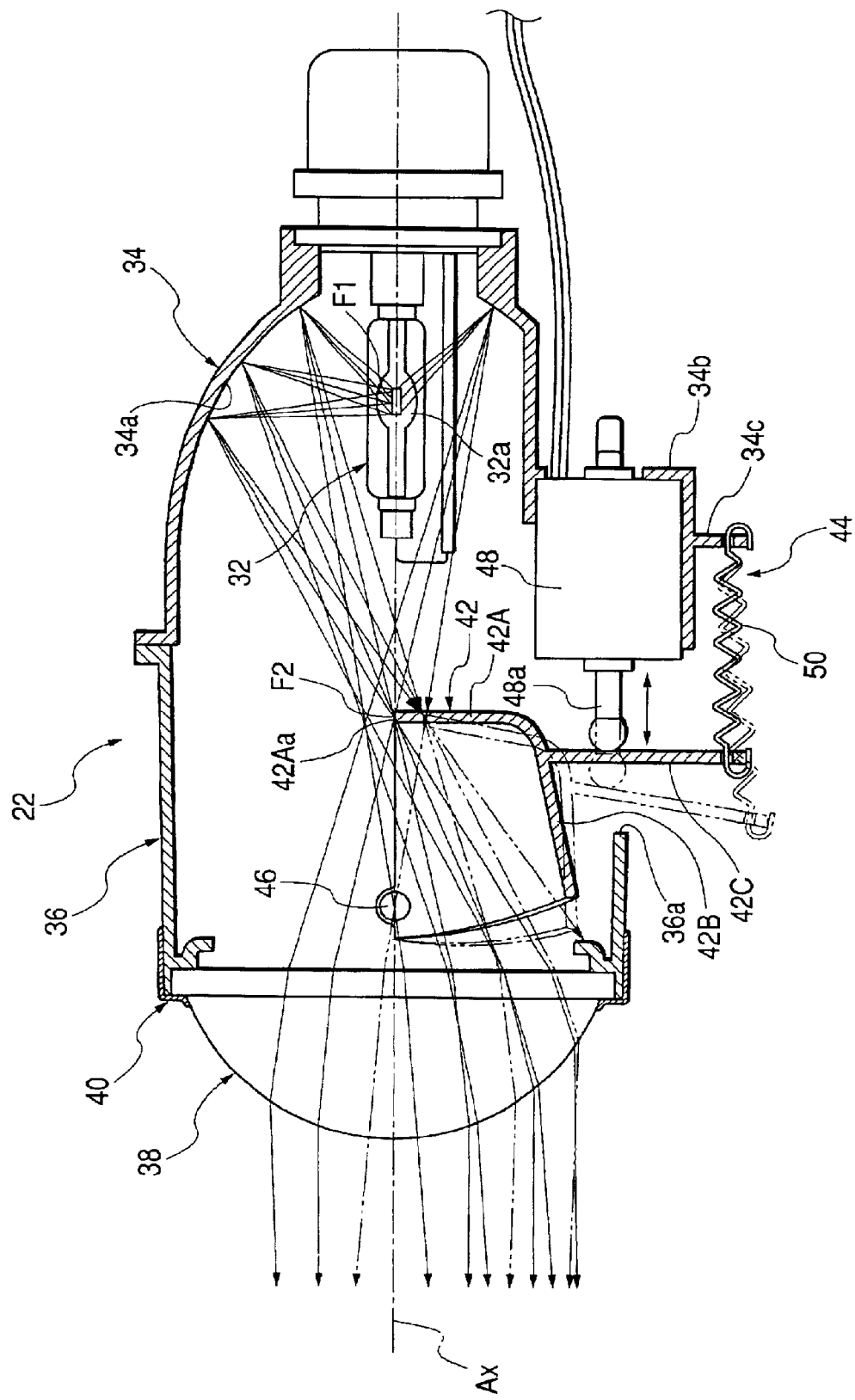
FIG. 2 is a sectional side view of a lamp unit for use in constituting the vehicle headlamp system.

FIG. 2 is a sectional side view of the lamp unit 22; and FIG. 3 is a detailed view of a portion of FIG. 2.

As shown in FIG. 2, the lamp unit 22 is a projector type lamp unit having a discharge bulb 32, a reflector 34, a holder 36, a condenser lens 38, a retaining ring 40, a shade 42, and shade driving mechanism 44.

The discharge bulb 32 may be a metal halide bulb that is fitted to a reflector 34 such that the discharge light emitting portion 32a (a light source) of the discharge bulb 32 is disposed coaxially with an optical axis Ax.

The reflector 34 has a substantially elliptic spherical reflective surface 34a with the optical axis Ax as a central axis. The reflective surface 34a is formed such that the sectional configuration including the optical axis Ax is elliptic, and that its eccentricity is set to grow gradually greater from the vertical to horizontal section. However, the rear apex of the ellipse forming each of the sections is set at the same position. The light source 32a is disposed at a first focal point F1 of the ellipse forming the vertical section of the reflective surface 34a. Therefore, the reflective surface 34a is adapted to reflect light from the light source 32a forward with a slight deviation to the optical axis Ax, and also to substantially converge the light to a second focal point F2 of the ellipse within the vertical section including the optical axis Ax.

The holder 36 has a cylindrical shape extending forward from the front end opening portion of the reflector 34 and is fixedly supported in its rear end portion. The holder fixedly supports the condenser lens 38 via the retaining ring 40 in its front end portion. Further, a cutout portion 36a is formed in the lower end portion of the holder 36.

The condenser lens 38 is a flat convex lens having a convex front-side surface and a flat rear-side surface. The rear-side focal point position is placed in conformity with the second focal point F2 of the reflective surface 34a of the reflector 34, whereby the condenser lens 38 allows the light reflected from the reflective surface 34a of the reflector 34 to concentrate on a point close to the optical axis Ax.

The shade 42 comprises a shade body portion 42A extending substantially along a vertical plane crossing the optical axis Ax at right angles, a substantially semi-cylindrical portion 42B extending forward from the peripheral edge portion of the shade body portion 42A, and a bracket portion 42C extending downward through the cutout portion 26a of the holder 36 from the lower end portion of the substantially semi-cylindrical portion 42B. The shade 42 is pivotally provided in the lower portion of the inner space of the holder 36. More specifically, the shade 42 is supported by the holder 36 via a pivotal pin 46 in the front upper end portions of both the left and right sides of the substantially semi-cylindrical portion 42B, so that the shade 42 is able to pivot between low- and high-beam forming positions around a horizontal axis.

When the shade 42 is in the low-beam forming position, the upper end edge 42A of the shade body portion 42A is arranged to pass the second focal point F2 and to remove the upward light emitted from the lamp unit 22 by partly shading the light reflected from the reflective surface 34a whereby to obtain light for low-beam emission (the beams shown by solid lines) carried out downwardly with respect to the optical axis Ax. Thus the low-beam luminous intensity distribution P(L) of the left-side luminous intensity has a Z-shaped cut-off line at laterally different levels as shown in FIG. 4(a). The upper stage portion of the cut-off line CL is set at substantially the same position as a line H—H and the lower stage portion of the cut-off line CL is set at a position 0.57 degrees lower with respect to the H—H line.

When the shade 42 is in the high-beam forming position, on the other hand, the shade 42 allows the upward beam emission from the lamp unit 22 by releasing the shading of the light reflected from the reflective surface 34a. A light pattern for high-beam emission is then obtained (the beams shown by solid and chain double-dashed lines). The high-beam luminous intensity distribution P(H) thus formed is shown in FIG. 4(b). Areas shown by HZ in these low- and high-beam luminous intensity distributions P(L) and P(H) are hot zones (high luminous intensity areas) in the respective luminous intensity distributions.

The shade driving mechanism 44 is provided with a motor driving unit 48 and a tension coil spring 50 which pivots the shade 42 between the low- and high-beam forming positions, and may also stop the shade 42 in any desired position therebetween. According to this embodiment of the invention, the shade 42 can be stopped in an upward correcting position (LOW+α) closer to the high-beam forming position (HIGH rather than the low-beam forming position, and a downward correcting position (LOW−β) further separated from the high-beam forming position than the low-beam forming position as shown by a broken line in FIG. 3. The aforementioned angles α and β may be set approximately α=0.4 degrees and β=0.5 degrees.

The output shaft 48a of the motor driving unit 48 is disposed as to extend parallel to the optical axis Ax, and the motor driving unit 48 is fixedly fitted in a motor housing portion 24b formed in the lower area of the reflector 24. This motor driving unit 48 is used to move the output shaft 48a in the longitudinal direction of the vehicle as a motor (not shown) operates to drive the motor driving unit 48 via a gear (not shown) so that the shaft is brought into contact with the bracket portion 42C of the shade 42 in the front end spherical portion of the output shaft 48a.

The tension coil spring 50 is extended in parallel to the optical axis Ax and its front end portion is retained by the bracket portion 42C of the shade 42, whereas its rear end portion is retained by a tab 34c projecting downward from the motor housing portion 34b. The tension coil spring 50 is normally used to resiliently urge the shade 42 toward the low-beam forming position, and also functions to prevent the shade 42 from having backlash by absorbing the backlash of the motor driving unit 48.

The details of beam emission control of the lamp unit 22 performed in the vehicle headlamp system 100 according to this embodiment of the invention will now be described.

While the vehicle is running on a straight flat road, the beam emission is carried out with the luminous intensity distribution as shown in FIGS. 4a and 4b. At this time, the control unit 102 causes the shade 42 to move to the low- or high-beam forming position in response to the operation of a beam changeover switch by the vehicle operator. Beam emission is then carried out with the low-beam luminous intensity distribution P(L) as shown in FIG. 4(a) or the high-beam luminous intensity distribution P(H) as shown in FIG. 4(b).

At this time, the low-beam luminous intensity distribution P(L) may be varied with the speed of one's own vehicle and the vehicle-to-vehicle distance to a preceding vehicle. The low-beam luminous intensity distribution P(L) is varied by moving the shade 42 from the low-beam forming position (LOW) to the upward correcting position (LOW+=|) or downward correcting position (LOW−β) and vertically moving the position of the cut-off line CL.

In an intermediate-high vehicle speed zone with a vehicle speed of V>25 km/h, the position of the cut-off line CL is raised or lowered according to the vehicle-to-vehicle distance L as it is important to secure sufficient forward visibility of the road surface ahead of the vehicle in view of increasing vehicle travel safety.

More specifically, in a normal travel condition with 30 m<L # 100 m as the vehicle-to-vehicle distance L, the lower stage portion of the cut-off line CL is held at a reference position (i.e., a 0.57 degrees lower position from the H—H line) as shown by solid lines in FIG. 5(a). When the preceding vehicle is far away with L>100 m as the vehicle-to-vehicle distance L, the cut-off line CL is displaced upward by 0.4 degrees from the reference position as shown by broken lines in FIG. 5(a) to increase the distant visibility of the road surface ahead of the vehicle. Since the preceding vehicle is far away or non-existent, no great glare is given to the driver of a preceding vehicle even though the luminous intensity distribution is turned upward. When the preceding vehicle is very close with L<30 m as the vehicle-to-vehicle distance L, the cut-off line CL is displaced downward by 0.5 degrees as shown by chain lines in FIG. 5(a) to decrease glare from affecting the driver of a preceding vehicle. As one's own vehicle is following the preceding vehicle, the remote visibility of the road surface ahead of one's own vehicle is not so important.

In a low vehicle speed area (including a standing condition) with a vehicle speed of V # 25 km, on the other hand, it is not necessary to increase the remote visibility of the road surface ahead of one's own vehicle, but it is important not to give a glare to the driver of a preceding vehicle. Consequently, as shown by the solid lines in FIG. 5(b), the cut-off line CL is displaced downward by 0.5 degrees from the reference position, shown by chain double-dashed lines in FIG. 5(b), irrespective of the vehicle-to-vehicle distance. Therefore, a useless upwardly-scattered light component of the beam emitted from the lamp unit 22 is prevented from being incident on the rear-view mirror or the like of the preceding vehicle, and this effectively prevents glare from being given to the driver of the preceding vehicle. Moreover, by thus fixing the cut-off line CL to the position displaced downward by 0.5 degrees from the reference position, an unpleasant feeling that something is wrong (or false alert) resulting from the change of the low-beam luminous intensity distribution P(L) is prevented from being given to the driver of a preceding vehicle.

FIGS. 6a and 6b show a luminous intensity distribution of light for irradiating the road shoulder P(s), which light is emitted from the adverse weather lamp 30 to illuminate the road shoulder portion S of the road surface ahead of the vehicle. The distribution P(s) is shown together with the low-beam luminous intensity distribution P(L) (FIG. 6(a)) and the high-beam luminous intensity distribution P(H) (FIG. 6(b)).

When the road surface ahead of the vehicle is wet during travel in rainy weather, vehicle visibility is worsened and driving becomes more difficult. However, the visibility of the road shoulder portion S is relatively good, and by irradiating the road shoulder portion S, attempts are made to increase the visibility and improve travel safety. Since the adverse weather lamp 30 is provided in the left-side headlamp 10L, the road shoulder portion S can be irradiated without curving the direction of beam emission to the left.

As set forth above in detail, the vehicle headlamp system 100 according to this embodiment of the invention is provided with a pair of left- and right-side headlamps 10L and 10R, respectively having the lamp units 22 containing the lamp bodies 14. Further, the vehicle-to-vehicle distance sensor 20 for measuring the vehicle-to-vehicle distance L between one's own vehicle and a preceding vehicle is incorporated in the right-side headlamp 10L. When the speed of one's own vehicle exceeds 25 km/h, the low-beam luminous intensity distribution P(L) of the lamp unit 22 is varied by the control unit 102 according to the vehicle-to-vehicle distance L, so that the beam emission can be carried out with the luminous intensity distribution according to the travel conditions of the vehicle. In other words, when the vehicle-to-vehicle distance L is long, the remote visibility is increased by slightly turning the low-beam luminous intensity distribution P(L) upward, whereas when the vehicle-to-vehicle distance L is short, glare is prevented from being given to the driver of a preceding vehicle by slightly turning the low-beam luminous intensity distribution P(L) downward.

Since the vehicle headlamp system 100 according to this embodiment of the invention is specifically intended for large-sized vehicles, the lamp unit 22 is located at a considerable height above the ground. This placement tends to give a glare to the driver of a preceding vehicle. Therefore, it is very effective to slightly turn the low-beam luminous intensity distribution P(L) downward as the occasion demands.

When the vehicle is running at a vehicle speed V of 25 km/h or lower, the low-beam luminous intensity distribution P(L) is fixed. Such operation prevents an unpleasant feeling of wrongness resulting from the change of the low-beam luminous intensity distribution P(L) from being given to the driver of a preceding vehicle in the low vehicle speed zone in which remote visibility is not that important.

As the low-beam luminous intensity distribution P(L) is varied by vertically moving the cut-off line CL according to this embodiment of the invention, it is possible to delicately vary the low-beam luminous intensity distribution P(L). In this manner, beam emission can be carried out with a luminous intensity distribution according to the travel conditions of the vehicle.

While the vehicle is running at a vehicle speed V of 25 km/h or lower, the cut-off line CL is fixed to the lowermost position to ensure that no glare is given to the driver of a preceding vehicle.

According to this embodiment of the invention, the vehicle-to-vehicle distance sensor 20 is contained in the lamp body 14 of the right-side headlamp 10R out of the pair of left- and right-side headlamps 10L and 10R. In addition, the adverse weather lamp 30 is contained in a position corresponding to the vehicle-to-vehicle distance sensor 20 in the lamp body 14 of the left-side headlamp 10L. The vehicle-to-vehicle distance sensor 20 is thus incorporated in the headlamp 10R so that the design of both headlamps 10L and 10R appears symmetrical.

The adverse weather lamp 30 is provided in the left-side headlamp 10L positioned on the road shoulder side. As a result, the luminous intensity distribution of light for irradiating the road shoulder P(s) is formed with a reasonable lamp arrangement.

Although the vehicle headlamp system for a left-side luminous intensity distribution has been described according to the above-described embodiment of the invention, similar operation and/or working effect may be achieved by laterally reversing the headlamps 10L and 10R with respect to the vehicle headlamp system for the right-side luminous intensity distribution.

The reference position of the low-beam luminous intensity distribution P(L) is such that the lower stage portion of the cut-off line CL may be set at the position 0.57 degrees downward from the H—H line, and the upward and downward correcting positions are set at the positions respectively deviated by 0.4 degrees and 0.5 degrees from the reference position according to the above-described embodiment of the invention. However, the upward and downward correcting positions may be set at other values.

Although it has been described that emission control of the lamp unit 22 is performed differently with a vehicle speed of 25 km/h as a boundary value according to the above-described embodiment of the invention, other vehicle speeds other than 25 km/h may be employed as the occasion demands. With respect to the vehicle-to-vehicle distance, although the described emission control of the lamp unit 22 is performed differently with 30 m and 100 m as value boundaries, any vehicle-to-vehicle distances other than 30 m and 100 m may be employed as well.

What is claimed is:

1. A vehicle headlamp system with headlamps, each of which contains a lamp unit within a lamp body for emitting beams forward with a predetermined luminous intensity distribution, comprising;

vehicle-to-vehicle distance measuring means for measuring the vehicle-to-vehicle distance between a first vehicle and a second preceding vehicle, and variable luminous intensity control means for varying said luminous intensity distribution according to said vehicle-to-vehicle distance when the speed of the first vehicle exceeds a predetermined value, wherein headlamps are provided on the left and right sides of a vehicle, thus forming a pair of headlamps and wherein said vehicle-to-vehicle distance measuring means is contained in the lamp body of a first of the headlamps, and wherein a second of the headlamps includes an auxiliary lamp in a position that corresponds to the position of the vehicle-to-vehicle distance measuring means in the lamp body of the first headlamp.

2. A vehicle headlamp system as claimed in claim 1, wherein said variable luminous intensity control means fixes said luminous intensity distribution when the speed of the first vehicle stays at said predetermined value or lower.

3. A vehicle headlamp system as claimed in claim 1, wherein said luminous intensity distribution is a luminous intensity distribution having a cut-off line at an upper end, and wherein said variable luminous intensity control means varies said luminous intensity distribution by vertically moving the position of said cut-off line.

4. A vehicle headlamp system as claimed in claim 3, wherein said variable luminous intensity control means fixes said cut-off line at a lowermost position while the speed of the first vehicle is kept at said predetermined value or lower.

5. A vehicle headlamp system as claimed in claim 1, wherein the second headlamp is located on the road shoulder side, and the auxiliary lamp irradiates the road shoulder portion of a road surface ahead of a vehicle.

6. A method for operating a vehicle headlamp system comprising:

measuring the distance between a first vehicle and a second preceding vehicle with a distance measuring means associated with a headlamp of the first vehicle;

varying a luminous intensity distribution of each headlamp of the headlamp system according to the distance between the first and second vehicles when the speed of the first vehicle exceeds a predetermined value; and illuminating a shoulder of a road with an auxiliary lamp associated with a second headlamp of the headlamp system.

7. The method of claim 6 further comprising stabilizing the luminous intensity distribution when the speed of the first vehicle remains at or below the predetermined value.

8. The method of claim 6 wherein the luminous intensity distribution is varied by moving the position of a cut-off line.

9. The method of claim 8 wherein the luminous intensity distribution is fixed at a lowermost position when the speed of the first vehicle is kept at the predetermined value or lower.

* * * * *